(12) United States Patent
Uchibori

(10) Patent No.: US 11,011,956 B2
(45) Date of Patent: May 18, 2021

(54) VEHICLE DRIVING APPARATUS

(71) Applicant: TOYOTA JIDOSHA KABUSHIKI KAISHA, Toyota (JP)

(72) Inventor: Nao Uchibori, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 16/454,180

(22) Filed: Jun. 27, 2019

(65) Prior Publication Data

US 2020/0036261 A1 Jan. 30, 2020

(30) Foreign Application Priority Data

Jul. 24, 2018 (JP) .............................. JP2018-138853

(51) Int. Cl.
| | |
|---|---|
| *H02K 5/24* | (2006.01) |
| *H02K 1/18* | (2006.01) |
| *H02K 7/00* | (2006.01) |
| *H02K 21/14* | (2006.01) |
| *B60K 6/26* | (2007.10) |

(52) U.S. Cl.
CPC .............. *H02K 5/24* (2013.01); *H02K 1/185* (2013.01); *H02K 7/006* (2013.01); *H02K 21/14* (2013.01); *B60K 6/26* (2013.01); *B60Y 2200/92* (2013.01); *B60Y 2400/60* (2013.01)

(58) Field of Classification Search
CPC .......... H02K 5/24; H02K 1/185; H02K 7/006; H02K 21/14; H02K 5/04; B60Y 2400/60; B60Y 2200/92; B60K 6/26; B60K 2006/4825; B60K 6/48; B60K 6/405

USPC .............................................. 310/51, 89, 91
See application file for complete search history.

(56) References Cited

U.S. PATENT DOCUMENTS

| | | | | |
|---|---|---|---|---|
| 3,606,594 | A | * | 9/1971 | Lewis et al. ............ F25B 31/02 417/415 |
| 6,717,312 | B1 | * | 4/2004 | Kaplan ................... H02K 7/088 310/254.1 |
| 2009/0068030 | A1 | * | 3/2009 | Valbjoern ................ F04B 39/02 417/363 |
| 2010/0074773 | A1 | * | 3/2010 | Watanabe ................ F01C 21/10 417/410.3 |

(Continued)

FOREIGN PATENT DOCUMENTS

| | | |
|---|---|---|
| JP | 2013-255303 A | 12/2013 |
| JP | 2016-059173 A | 4/2016 |

(Continued)

*Primary Examiner* — John K Kim
(74) *Attorney, Agent, or Firm* — Oliff PLC

(57) ABSTRACT

A vehicle driving apparatus including: a rotating machine including a rotor and a stator; a motor case storing therein the rotating machine and fastened to a non-rotary member; and an intermediate member including (i) a main body having a flat plate shape and (ii) a protrusion which protrudes in a direction of an axis of the rotating machine from a surface of the main body on a side of the rotating machine and which has an annular shape surrounding the axis. The protrusion of the intermediate member includes a plurality of stator fastening portions through which the stator of the rotating machine is fastened to the intermediate member. The intermediate member is fastened to a high rigidity portion of the motor case that has a higher rigidity than the other portion of the motor case.

6 Claims, 6 Drawing Sheets

(56) References Cited

U.S. PATENT DOCUMENTS

| | | | |
|---|---|---|---|
| 2012/0199437 A1* | 8/2012 | Okuda | F16D 48/04 |
| | | | 192/85.63 |
| 2018/0048209 A1* | 2/2018 | Baba | H02K 7/14 |
| 2018/0162376 A1* | 6/2018 | Colavincenzo | B60K 6/387 |
| 2019/0264794 A1* | 8/2019 | Fujikawa | H02K 7/006 |
| 2020/0036261 A1* | 1/2020 | Uchibori | H02K 1/185 |

FOREIGN PATENT DOCUMENTS

| | | |
|---|---|---|
| JP | 2017-022912 A | 1/2017 |
| JP | 2017-127150 A | 7/2017 |

\* cited by examiner

VEHICLE DRIVING APPARATUS

This application claims priority from Japanese Patent Application No. 2018-138853 filed on Jul. 24, 2018, the disclosure of which is herein incorporated by reference in its entirety.

FIELD OF THE INVENTION

The present invention relates to a vehicle driving apparatus including a rotating machine stored in a motor case.

BACKGROUND OF THE INVENTION

There is known a vehicle driving apparatus provided with a rotating machine including a rotor and a stator, and a motor case storing therein the rotating machine. For example, JP-2017-22912A discloses such a vehicle driving apparatus. Where a stator core constituted by electromagnetic steel sheets that are superposed on each other is supported in a cantilever manner, at one of its opposite end portions that are opposite to each other in a direction of an axis of the rotating machine, by the motor case through fasteners such as bolts, as in the vehicle driving apparatus disclosed in the Japanese Patent Application Publication, rigidity of the stator in a radial direction of the rotating machine and a rigidity of the stator in a circumferential direction of the rotating machine are made low, so that motor noise caused due to vibration of the stator is likely to be problematic. The Japanese Patent Application Publication teaches an arrangement in which the stator is fixed to the motor case through an intermediate member whose rigidity in the circumferential direction is low, for the purpose of reducing transmission of the stator vibration to the motor case.

SUMMARY OF THE INVENTION

By the way, there are 2n-th order noise, 6n-th order noise, 12n-th order noise and carrier noise, for example, as kinds of the motor noises. In the arrangement in which the stator is fixed to the motor case through the intermediate member whose rigidity in the circumferential direction is low, as disclosed in the above-identified Japanese Patent Application Publication, although the transmission of the stator vibration to the motor case is reduced, the stator vibration acting in the circumferential direction and relating to the 6n-th order noise and 12n-th order noise is increased. Further, in the disclosed arrangement, a vibration frequency range or resonance frequency range is shifted to a lower frequency range in which vibration transmission sensitivity of the vehicle is unfavorably increased, for example, due to poor vibration damping by a soundproofing material, whereby the 6n-th order noise and 12n-th order noise could be worsen and problematic. It is noted that "n" of the above-described 2n-th order noise, 6n-th order noise and 12n-th order noise represents a number of pair or pairs of N and S poles constituted by permanent magnets provided in the rotor.

The present invention was made in view of the background art described above. It is therefore an object of the present invention to provide a vehicle driving apparatus capable of entirely reducing a plurality of kinds of motor noises caused by stator vibration.

The object indicated above is achieved according to the following aspects of the present invention.

According to a first aspect of the invention, there is provided a vehicle driving apparatus including: a rotating machine including a rotor and a stator; a motor case storing therein the rotating machine and fastened to a non-rotary member; and an intermediate member including (i) a main body having a flat plate shape and (ii) a protrusion which protrudes in a direction of an axis of the rotating machine from a surface of the main body on a side of the rotating machine and which has an annular shape surrounding the axis, wherein the protrusion of the intermediate member includes a plurality of stator fastening portions through which the stator of the rotating machine is fastened to the intermediate member, and wherein the intermediate member is fastened to a high rigidity portion of the motor case that has a higher rigidity than the other portion of the motor case. For example, the stator is supported in a cantilever manner at one of opposite end portions thereof that are opposite to each other in the direction of the axis, by the protrusion of the intermediate member.

According to a second aspect of the invention, in the vehicle driving apparatus according to the first aspect of the invention, the non-rotary member is an engine block, wherein the motor case is fastened at a fastened portion thereof to the engine block, and wherein the high rigidity portion of the motor case is closer than the other portion of the motor case, to the fastened portion of the motor case.

According to a third aspect of the invention, in the vehicle driving apparatus according to the first or second aspect of the invention, the motor case has an opening in one of opposite ends thereof that are opposite to each other in the direction of the axis, wherein the intermediate member is a case over that covers the opening of the motor case.

According to a fourth aspect of the invention, in the vehicle driving apparatus according to the first aspect of the invention, the non-rotary member is an engine block, wherein the motor case has an opening in an end thereof on a side of the engine block, wherein the intermediate member is a case over that covers the opening of the motor case, and wherein the high rigidity portion of the motor case is closer than the other portion of the motor case, to the engine block.

According to a fifth aspect of the invention, in the vehicle driving apparatus according to any one of the first through fourth aspects of the invention, the protrusion, which has the annular shape, has a radial thickness measured in a radial direction of the rotating machine, wherein the radial thickness of the protrusion is larger in the stator fastening portions than in the other portion of the protrusion.

According to a sixth aspect of the invention, in the vehicle driving apparatus according to any one of the first through fifth aspects of the invention, the rotor of the rotating machine includes permanent magnets that constitute a given number of pair or pairs of N and S poles, wherein the plurality of stator fastening portions of the protrusion consist of a given number of stator fastening portions such that the given number of stator fastening portions is equal to or twice as large as the given number of pair or pairs of N and S poles constituted by the permanent magnets of the rotor, and wherein the given number of stator fastening portions are arranged at a constant interval.

According to a seventh aspect of the invention, in the vehicle driving apparatus according to one of the first through sixth aspects of the invention, the stator is disposed outside the rotor in a radial direction of the rotating machine, wherein the stator includes a plurality of radially protruding portions which are arranged around the axis and which protrude outwardly in the radial direction, and wherein the plurality of radially protruding portions have respective holes that receive respective bolts though which the stator is fastened to the stator fastening portions.

In the vehicle driving apparatus according to the first aspect of the invention, the stator of the rotating machine is fastened to the intermediate member through the plurality of stator fastening portions of the annular-shaped protrusion of the intermediate member, so that a rigidity of the stator fastening portions in a circumferential direction of the rotating machine is maintained while a rigidity of the stator fastening portions in a radial direction of the rotating machine is reduced. Since the rigidity of the stator fastening portions in the circumferential direction is maintained, it is possible to prevent increase of the stator vibration acting in the circumferential direction and relating to the 6n-th order noise and 12n-th order noise and to prevent the resonance frequency range from being shifted to a lower frequency range in which the vibration transmission sensitivity of the vehicle is unfavorably increased. Further, since the rigidity of the stator fastening portions in the radial direction of the rotating machine is reduced, it is possible to damp the stator vibration acting in the radial direction and relating to the 2n-th order noise and carrier noise and accordingly to reduce transmission of the stator vibration in the radial direction to the motor case. Moreover, since the intermediate member is fastened to the high rigidity portion of the motor case, it is possible to reduce transmission of the stator vibration in the circumferential direction to the motor case. Thus, it is possible to reduce all of the plurality of kinds of motor noises caused by the stator vibration.

In the vehicle driving apparatus according to the second aspect of the invention, the motor case is fastened at its fastened portion to the engine block, and the high rigidity portion of the motor case is closer than the other portion of the motor case (which has a lower rigidity than the high rigidity portion), to the fastened portion of the motor case. Thus, the intermediate member is fastened to the high rigidity portion of the motor case, which is fastened to the engine block, namely, which is located on a side of the engine block.

In the vehicle driving apparatus according to the third aspect of the invention, the intermediate member is a case over that covers the opening of the motor case. Thus, the stator is fastened to the case cover as the intermediate member through the stator fastening portions of the annular-shaped protrusion of the case cover, and the case cover is fastened to the high rigidity portion of the motor case.

In the vehicle driving apparatus according to the fourth aspect of the invention, the intermediate member is the case over that covers the opening that is provided in the end of the motor case, which is located on the side of the engine block, wherein the high rigidity portion of the motor case is closer than the other portion of the motor case, to the engine block. Thus, the stator is fastened to the case cover as the intermediate member through the stator fastening portions of the annular-shaped protrusion of the case cover, and the case cover is fastened to the high rigidity portion of the motor case, which is located on the side of the engine block.

In the vehicle driving apparatus according to the fifth aspect of the invention, the radial thickness of the protrusion of the intermediate member is larger in the stator fastening portions than in the other portion of the protrusion that is other than the stator fastening portions, so that a rigidity of the stator fastening portions in the radial direction is more reduced. Thus, the transmission of the stator vibration acting in the radial direction and relating to the 2n-th order noise and carrier noise can be more effectively damped.

In the vehicle driving apparatus according to the sixth aspect of the invention, the given number of stator fastening portions is equal to or twice as large as the given number of pair or pairs of N and S poles constituted by the permanent magnets of the rotor, and the given number of stator fastening portions are arranged at a constant interval. Thus, it is possible to reduce the stator vibration acting in the radial direction which is caused by stator resonance vibration in a low frequency range, e.g., in the neighborhood of 500 Hz, and which relates to the 2n-th order noise.

In the vehicle driving apparatus according to the seventh aspect of the invention, the stator, which is disposed outside the rotor in the radial direction, includes the plurality of radially protruding portions which are arranged around the axis and which protrude outwardly in the radial direction, and the plurality of radially protruding portions have the respective holes that receive the respective bolts through which the stator is fastened to the stator fastening portions. Thus, the stator is fastened to the intermediate member in an appropriate manner.

DETAILED DESCRIPTION OF PREFERRED EMBODIMENT

Hereinafter, a preferred embodiment of the invention will be described in detail with reference to the accompanying drawings.

Embodiment

Figure 1:
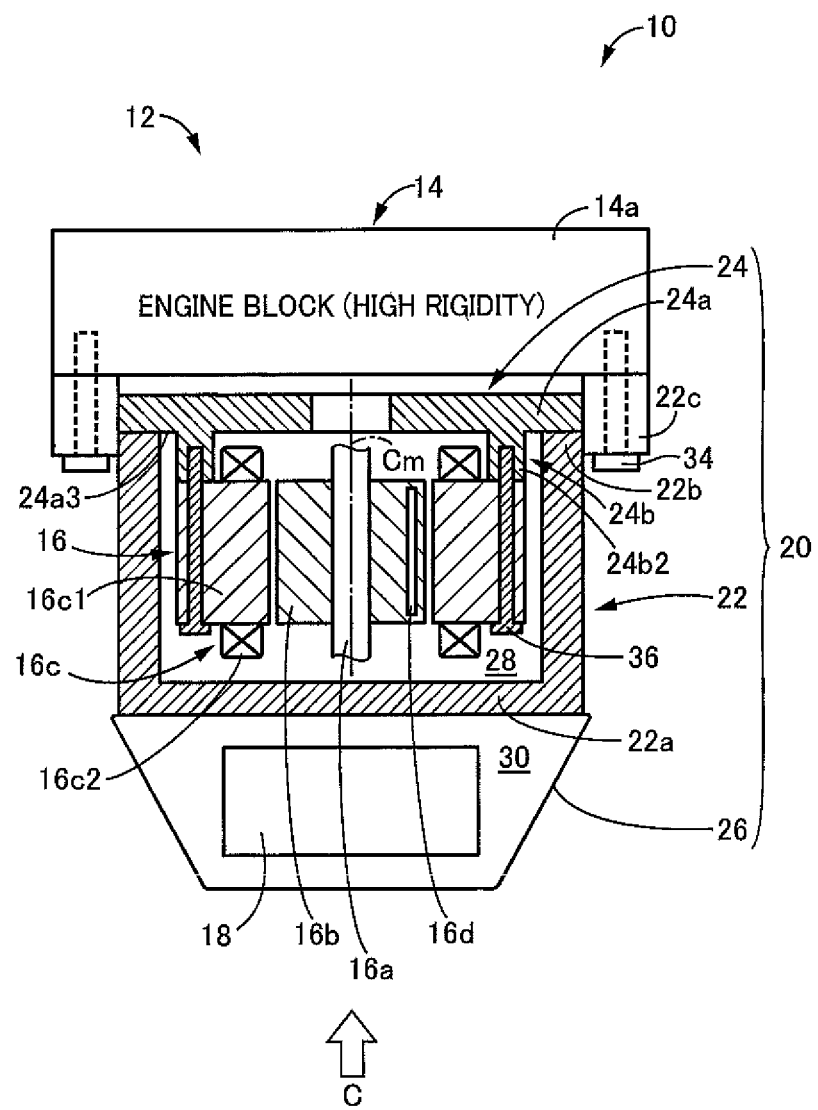
FIG. 1 is a view schematically showing a construction of a vehicle driving apparatus to which the present invention is applied, wherein the view includes a cross sectional view taken along line A-A indicated in FIG. 3.
Figure 2:
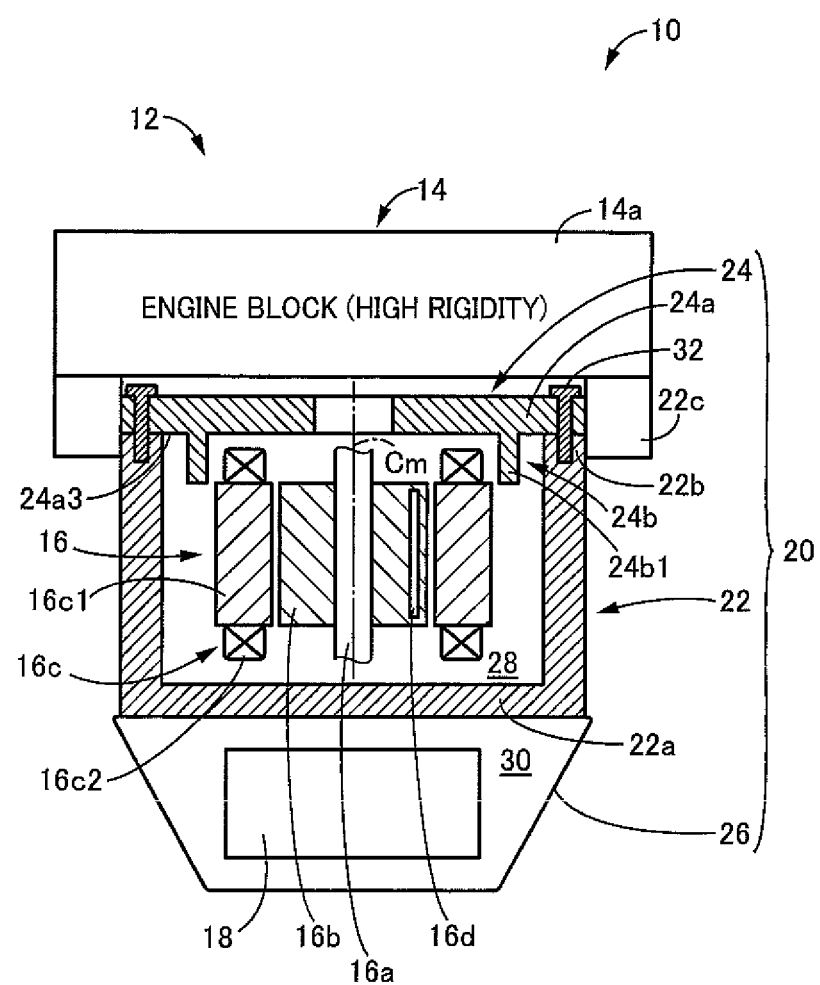
FIG. 2 is a view schematically showing the construction of the vehicle driving apparatus to which the present invention is applied, wherein the view includes a cross sectional view taken along line B-B indicated in FIG. 3.

FIGS. 1 and 2 are views schematically showing a construction of a vehicle driving apparatus 12 provided in a vehicle 10, to which the present invention is applied. As shown in FIGS. 1 and 2, the vehicle driving apparatus 12 includes an engine 14, a rotating machine 16, a drive-force transmitting device 18 and a case assembly 20. Each of FIGS. 1 and 2 is a view as seen in a direction perpendicular to an axis Cm of the rotating machine 16, and shows a part of the vehicle driving apparatus 12, wherein the view contains a cross sectional view which shows a part of the rotating machine 16 and a part of the case assembly 20 and which is taken in a plane containing the axis Cm. The cross section view in FIG. 1 is taken along line A-A indicated in FIG. 3. The cross section view in FIG. 2 is taken along line B-B indicated in FIG. 3.

The rotating machine 16 includes a rotor shaft 16a, a rotor 16b that is fixedly mounted on a central portion of the rotor shaft 16a in a direction of the axis Cm, unrotatably relative to the rotor shaft 16a, and a stator 16c that is disposed outside the rotor 16b in a radial direction of the rotating machine 16. The rotor shaft 16a has an axis that corresponds to the axis Cm of the rotating machine 16. The rotor 16b includes a plurality of permanent magnets 16d. The stator 16c includes a tubular-shaped stator core 16c1 constituted by ring-shaped electromagnetic steel sheets that are superposed on each other in the direction of the axis Cm, and also windings wound on the stator core 16c1. Coil ends 16c2 of the windings are shown in FIGS. 1 and 2. The rotating machine 16 is an alternating current synchronous motor, for example, which is configured to generate a torque whose magnitude is substantially proportional with an amount of three-phase alternating current that is supplied to the three-phase windings by an inverter (not shown) provided in the vehicle 10, such that a rotational speed of the rotating machine 16 is changed depending on a frequency of the alternating current source.

The drive-force transmitting device 18 includes, for example, a transmission mechanism (not shown), a reduction mechanism (not shown) connected to an output rotary member of the transmission mechanism, a differential gear device (not shown) connected to the reduction mechanism, and axles (not shown) connected to the differential gear device. The drive-force transmitting device 18 is configured to transmit a drive force of the engine 14 and/or a drive force of the rotating machine 16, to drive wheels (not shown) of the vehicle 10.

The case assembly 20 includes a motor case 22, a case cover 24 and a gear case 26, and defines a motor room 28 and a gear room 30, such that the rotating machine 16 is stored in the motor room 18, and such that the drive-force transmitting device 18 is stored in the gear room 30 except its part such as the axles.

The motor case 22 is a tubular-shaped case that includes a partition wall portion 22a, an engine-side end portion 22b and a flange portion 22c. The partition wall portion 22a separates the motor room 28 and the gear room 30 from each other. The flange portion 22c protrudes from the engine-side end portion 22b that is an end portion on a side of the engine 14, outwardly in the radial direction. The motor case 22 has an opening that opens at one of its opposite ends that are opposite to each other in the direction of the axis Cm, which one is on a side of the engine 14. The case cover 24 is integrally fastened to the motor case 22 by fasteners in the form of cover fastening bolts 32 (see FIG. 2) such that the case cover 24 covers the opening of the motor case 22 which opens at the end on the side of the engine 14. The motor case 22 cooperates with the case cover 24 to define the motor room 28 in which the rotating machine 16 is disposed. The motor case 22 is fastened at the flange portion 22c to an engine block 14a of the engine 14 by fasteners in the form of case fastening bolts 34 (see FIG. 1). That is, the motor case 22 is fastened to a non-rotary member in the form of the engine block 14a. The case cover 24 covers the opening of the motor case 22 which opens on the side of the engine 14. It is noted that the flange portion 22c corresponds to "fastened portion" recited in the appended claims.

The stator 16c of the rotating machine 16 is fastened, at only one of its opposite end portions that are opposite to each other in the direction of the axis Cm, to the case cover 24, by fasteners in the form of stator fastening bolts 36 that are inserted from the other of the opposite end portions of the stator 16c (see FIG. 1). The stator fastening bolts 36 are screwed in respective stator fastening portions 24b2 of the case cover 24 to which the stator 16c is fastened. Thus, the stator 16c of the rotating machine 16 is supported in a cantilever manner at one of the opposite end portions thereof that are opposite to each other in the direction of the axis Cm, by the case cover 24. The stator 16c is attached to the motor case 22 through the case cover 24. The case cover 24 serves as an intermediate member that is provided between the rotating machine 16 and the motor case 22, namely, between the stator 16c and the motor case 22.

The gear case 26 is a tubular-shaped case having a bottom wall at one of its opposite ends which is remote from the engine 14. The gear case 26 has an opening at the other of its opposite ends which is on a side of the engine 14. The gear case 26 is fastened to the motor case 22 by fasteners in the form of bolts (not shown), such that the opening of the gear case 26 and the partition wall portion 22a (that is remote from the engine 14) are opposed to each other. The gear case 26 cooperates with the partition wall portion 22a of the motor case 22 to define the gear room 30 in which the drive-force transmitting device 18 except its part such as the axles is disposed.

There will be described a fastening structure by which the stator 16c is supported in a cantilever manner. In a fastening structure in which the stator 16c of the rotating machine 16 is cantilever-supported by directly the motor case 22 through bolts, for example, a rigidity of the stator 16c in the radial direction and a rigidity of the stator 16c in a circumferential direction of the rotating machine 16 are low, various kinds of motor noises such as 2n-th order noise, 6n-th order noise, 12n-th order noise and carrier noise are likely to be problematic. It is noted that "n" of the 2n-th order noise, 6n-th order noise and 12n-th order noise represents a number n of pair or pairs of N and S poles constituted by the permanent magnets 16d provided in the rotor 16b of the rotating machine 16.

The 2n-th order noise, 6n-th order noise and 12n-th order noise are motor noises that are caused by stator vibration that is generated due to torque pulsation accompanying rotation of the rotating machine 16. The carrier noise is a motor noise that is caused by stator vibration that is generated due to, for example, current pulsation accompanying switching process carried out in the inverter for supplying the three-phase alternating current. Thus, the various kinds of motor noises are different in terms of mode of input of force forcing the stator 16c to be vibrated and in terms of excited resonance vibration. For example, the mode of input of the force forcing the stator 16c to be vibrated is the vibration acting in the radial direction in cases of the 2n-th order noise and the carrier noise, and the mode of input of the force forcing the stator 16c to be vibrated is the vibration acting in the circumferential direction in cases of the 6n-th order noise and the 12n-th order noise.

In the fastening structure in which the stator 16c of the rotating machine 16 is cantilever-supported by directly the motor case 22 through bolts or the like, it might be possible to set the number of fastened portions (at which the stator 16c is fastened to the motor case 22 through the bolts or the like) to a number equal to or twice as large as the number of pair or pairs of N and S poles in the rotor 16b, for the purpose of reducing the 2n-th order noise caused by stator resonance vibration in a low-frequency range, e.g., in the neighborhood of 500 Hz. However, in this arrangement, a transmission path of the stator vibration to the motor case 22 is increased so that the 2n-th order noise in a high-frequency range, the 6n-th order noise, the 12-th order noise and the carrier noise are likely to be worsen. Further, it might be possible to fasten the stator 16c to the motor case 22 through an intermediate member having low rigidity, for the purpose of reducing transmission of the stator vibration to the motor case 22, In this arrangement, the transmission of the stator vibration acting in the radial direction is reduced by damping, so that the 2n-th order noise and the carrier noise are improved. However, in this arrangement in which the stator 16c is fastened to the motor case 22 through the intermediate member having the low rigidity, the rigidity in the circumferential direction is reduced whereby the stator vibration acting in the circumferential direction is increased. Further, in this arrangement, a vibration frequency range or resonance frequency range is shifted to a lower frequency range in which vibration transmission sensitivity of the vehicle is unfavorably increased, for example, due to poor vibration damping by a soundproofing material, whereby the 6n-th order noise and 12n-th order noise could be worsen and problematic.

In the present embodiment, there is proposed a fastening structure for supporting the stator 16c of the rotating machine 16 in a cantilever manner, which is capable of reducing the plurality of kinds of motor noises at the same time. In the present embodiment, the case cover 24 and the stator core 16c1 cooperate with each other to establish such a fastening structure for supporting the stator 16c in a cantilever manner.

Figure 3:
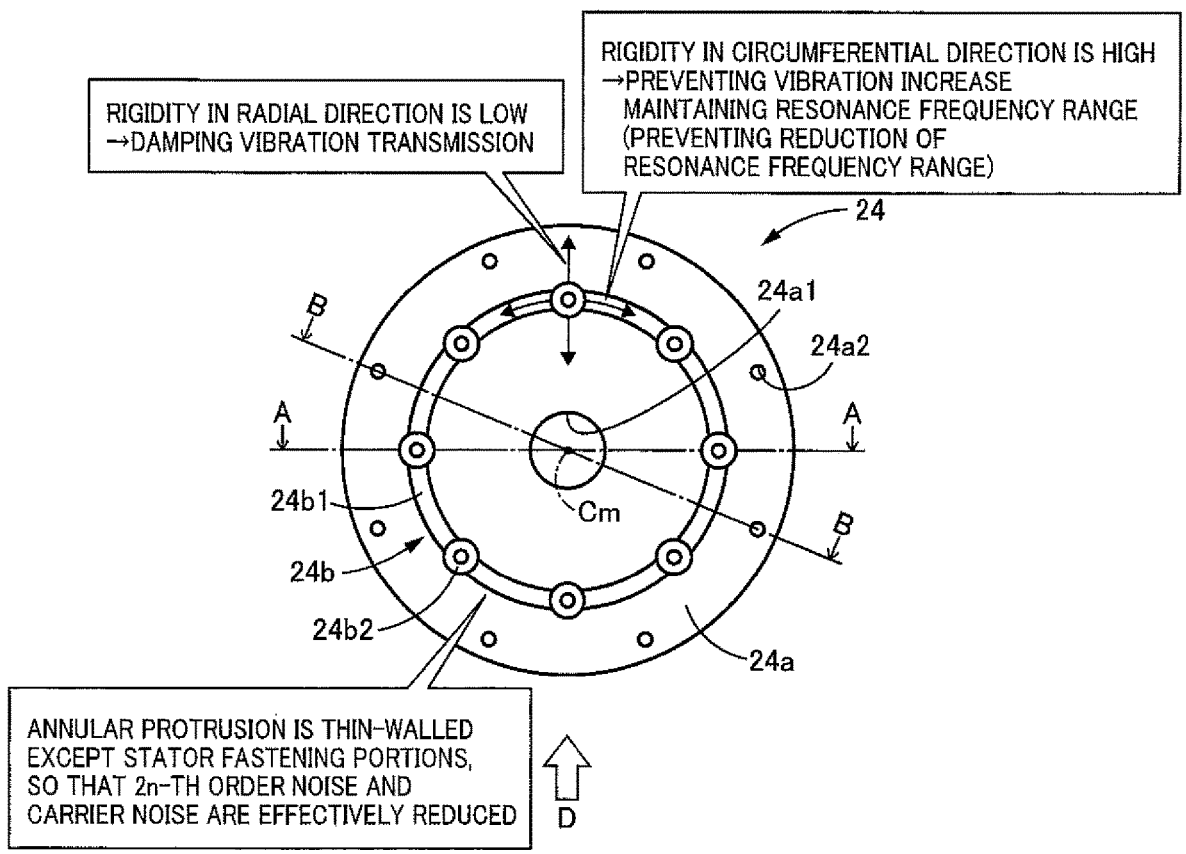
FIG. 3 is a view for explaining a construction of a case cover that is constructed to reduce all of a plurality of kinds of motor noises, wherein the view is taken in a direction of arrow C indicated in FIG. 1.
Figure 4:
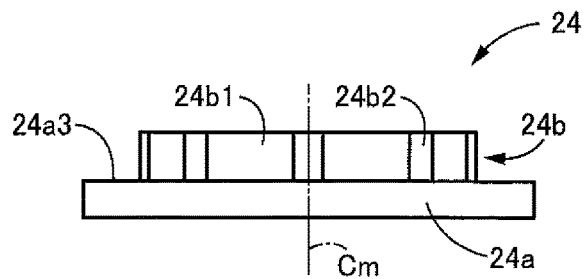
FIG. 4 is a view of the case cover shown in FIG. 3, wherein the view is take from a direction of arrow D indicated in FIG. 3.

FIGS. 3 and 4 are views for explaining a construction of the case cover 24 that is constructed to reduce all of the plurality of kinds of motor noises. FIG. 3 is an external view of the case cover 24, wherein the external view is seen in a direction which is toward the engine 14 and which is parallel to the direction of the axis Cm of the rotating machine 16, namely, the external view is taken in a direction of arrow C indicated in FIG. 1, FIG. 4 is an external view of the case cover 24, wherein the external view is taken from another direction, i.e., a direction of arrow D indicated in FIG. 3.

As shown in FIGS. 3 and 4, the case cover 24 includes a main body 24a having a flat plate shape and a protrusion 24b having an annular shape. The protrusion 24b protrudes from a surface 24a3 of the flat-plate-shaped main body 24a on a side of the rotating machine 16, in the direction of the axis Cm toward the rotating machine 16. The annular shape of the protrusion 24b surrounds the axis Cm of the rotating machine 16, such that the annular-shaped protrusion 24b is coaxial with the axis Cm. That is, the annular-shaped protrusion 24b is provided on the surface 24a3 on the side of the rotating machine 16, and is located on a given circumference about the axis Cm. The main body 24a has an outer periphery (i.e., radially outer end) whose shape is conformed with a shape of an outer periphery (i.e., radially outer end) of the motor case 22. The main body 24a has, at its center that is aligned with the axis Cm, a shaft receiving hole 24a1 through which a connecting shaft (not shown) connecting, for example, the engine 14 and the drive-force transmitting device 18 passes. The main body 24a further has a plurality of cover fastening holes 24a2 which lie on a given circumference located radially outside the annular-shaped protrusion 24b and which are arranged at a substantially constant interval in the circumferential direction. The above-described cover fastening bolts 32 pass through the respective cover fastening holes 24a2, so as to fasten the case cover 24 to the motor case 22.

The annular-shaped protrusion 24b includes a thin-walled cylindrical tubular portion 24b1 and a plurality of stator fastening portions 24b2 to which the stator 16c of the rotating machine 16 are fastened. The cylindrical tubular portion 24b1 connects each adjacent two of the stator fastening portions 24b2 which are adjacent to each other in the circumferential direction. The stator fastening bolts 36 are screwed in the respective stator fastening portions 24b2, so as to fasten the stator core 16c1 to the case cover 24 (see FIG. 1). Thus, the case cover 24 includes the stator fastening portions 24b2 provided in the protrusion 24b.

The protrusion 24b has a radial thickness that is a thickness measured in the radial direction, wherein the radial thickness is larger in the stator fastening portions 24b2 than in the thin-walled cylindrical tubular portion 24b1 that corresponds to "other portion (of the protrusion)" recited in the appended claims, namely, the radial thickness is smaller than the thin-walled cylindrical tubular portion 24b1 than in the stator fastening portions 24b2. The number of the stator fastening portions 24b2, which are provided in the protrusion 24b and arranged at a substantially constant interval in the circumferential direction, is equal to or twice as large as the number n of pair or pairs of N and S poles. In the present embodiment, the number of the stator fastening portions 24b2 is eight, and the number n of pairs of N and S poles provided in the rotor 16b is four or eight.

Figure 5:
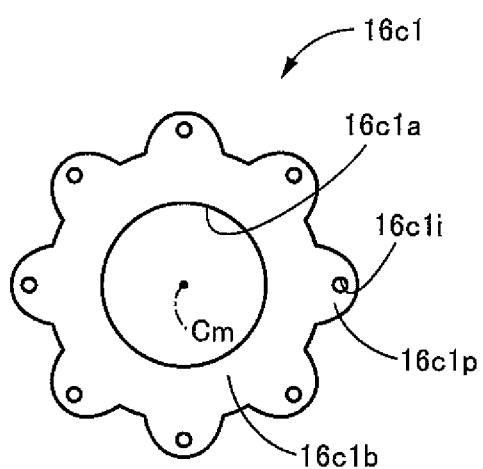
FIG. 5 is a view for explaining a construction of a stator core that is fastened to the case cover, wherein the view is taken in a direction of an axis of a rotating machine.

FIG. 5 is a view for explaining a construction of the stator core 16c1 that is fastened to the case cover 24, wherein the view is an external view of the stator core 16c1, which is taken in the direction of the axis Cm of the rotating machine 16. As shown in FIG. 5, the stator core 16c1 of the stator 16c includes a core base portion 16c1b on which windings are wound, and a plurality of radially protruding portions 16c1p which are arranged around the axis Cm and which protrude from the core base portion 16c1b outwardly in the radial direction. The core base portion 16c1b has, at its center that is aligned with the axis Cm, a rotor hole 16c1a in which the rotor 16b is disposed. The radially protruding portions 16c1p have respective bolt receiving holes 16c1i through which the respective stator fastening bolts 36 pass. The bolt receiving holes 16c1i, whose number is equal to the number of the stator fastening portions 24b2 of the case cover 24, are located in respective positions that are opposed to the respective stator fastening portions 24b2 in the axial direction.

The stator 16c is supported in a cantilever manner at one of opposite end portions thereof that are opposite to each other in the direction of the axis Cm, by the case cover 24, such that the stator 16c is fastened in a cantilever manner to the stator fastening portions 24b2 of the protrusion 24b of the case cover 24 through the stator fastening bolts 36 (see FIG. 1). Further, the case cover 24 is fastened to the motor case 22 through the cover fastening bolts 32 which pass through the respective cover fastening holes 24a2 and which are screwed in the engine-side end portion 22b of the motor case 22 (see FIG. 2). The engine-side end portion 22b is a portion of the motor case 22 which is close to the engine block 14a and which is adjacent to the flange portion 22c that is fastened to the engine block 14a. The engine block 14a has a high rigidity so that the flange portion 22c is a portion of the motor case 22 that has a relatively high rigidity. Therefore, the engine-side end portion 22b, that is adjacent to the flange portion 22c, also is a portion of the motor case 22 that has a relatively high rigidity. That is, a high rigidity portion of the motor case 22, which has a relatively high rigidity, is constituted by the engine-side end portion 22b that is located to be closer to the flange portion 22c than a portion of the motor case 22 having a relatively low rigidity. Thus, the case cover 24 is fastened to the high rigidity portion of the motor case 22 having the relatively high rigidity.

Thus, in the present embodiment, the fastening structure for supporting the stator 16c in the cantilever manner is a fastening structure in which the stator core 16c1 is fastened, through the stator fastening bolts 36, to the stator fastening portions 24b2 of the thin-walled annular-shaped protrusion 24b of the case cover 24, and the case cover 24 (to which the stator 16c is fastened) is fastened to the high rigidity portion of the motor case 22 which is close to the engine block 14a. That is, the fastening structure for supporting the stator 16c is a fastening structure in which the stator 16c is fastened, through the case cover 24 having the protrusion 24b, to the portion of the motor case 22 that is on the side of the engine block 14a.

The stator vibration acting in the circumferential direction, which relates to the 6n-th order noise and 12n-th order noise, is largely dependent on the rigidity of the stator fastening portions 24b2, so that the stator vibration acting in the circumferential direction is likely to be worsen if the rigidity of the stator fastening portions 24b2 is reduced. Meanwhile, the stator vibration acting in the radial direction, which relates to the 2n-th order noise and carrier noise, is largely dependent on the rigidity of the stator 16c itself, so that the stator vibration acting in the radial direction is unlikely to be increased even if the rigidity of the stator fastening portions 24b2 is low. Since the protrusion 24b is given the thin-walled annular shape and is provided to protrude in the direction of the axis Cm of the rotating machine 16, the rigidity of the stator fastening portions 24b2 in the circumferential direction is kept high and the rigidity of the stator fastening portions 24b2 in the radial direction is reduced, while the stator core 16c1 is fastened to the case cover 24. Thus, the rigidity of the stator fastening portions 24b2 in the circumferential direction is maintained whereby the stator vibration acting in the circumferential direction is unlikely to be worsen, and whereby the resonance frequency range is likely to be maintained, namely, the resonance frequency range is unlikely to be lowered. Thus, the 6n-the noise and 12n-th order noise are unlikely to be worsen. Further, as in the present embodiment, where the radial thickness of the cylindrical tubular portion 24b1 is smaller than the radial thickness of the stator fastening portions 24b2 in the annular-shaped protrusion 24b, the rigidity of the stator fastening portions 24b2 in the radial direction is reduced whereby the 2-th order noise and the carrier noise are more effectively reduced. Further, since the stator 16c is fastened to the portion of the motor case 22 that is on the side of the engine block 14a, the stator vibration acting in the circumferential direction is restrained from being transmitted to the motor case 22. Thus, the 6n-th order noise and 12n-th order noise are reduced.

Figure 6:
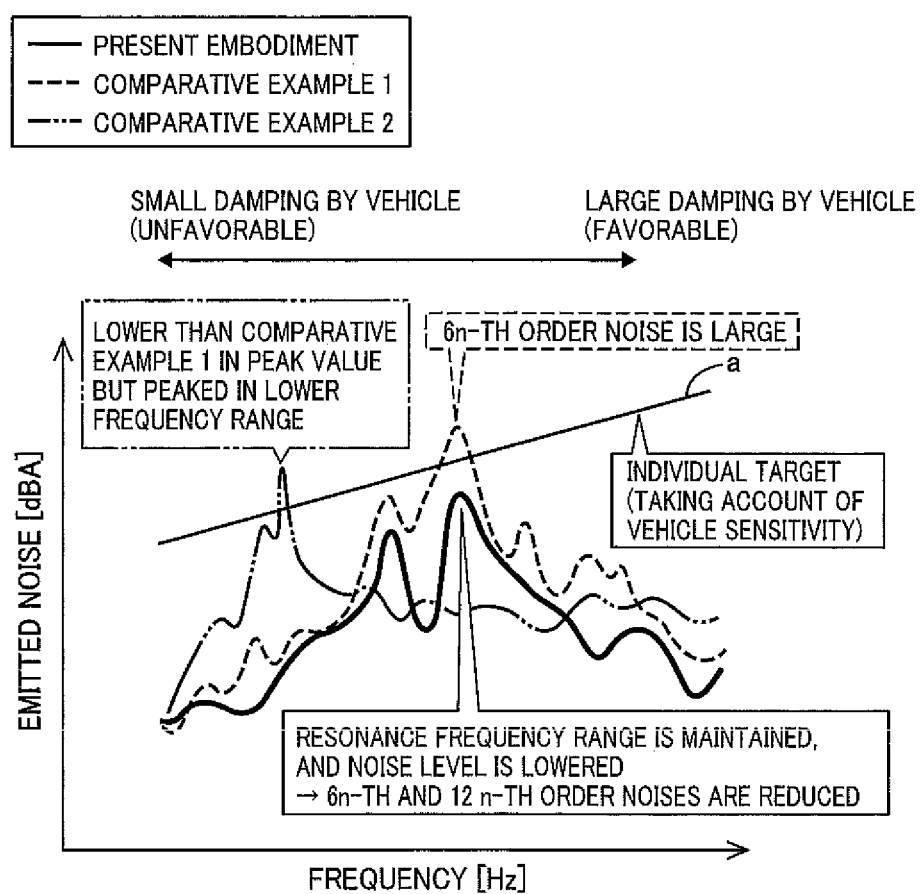
FIG. 6 is a view for comparing 6n-th order noise in a fastening structure in an embodiment of the invention, with that in each of comparative examples.
Figure 7:
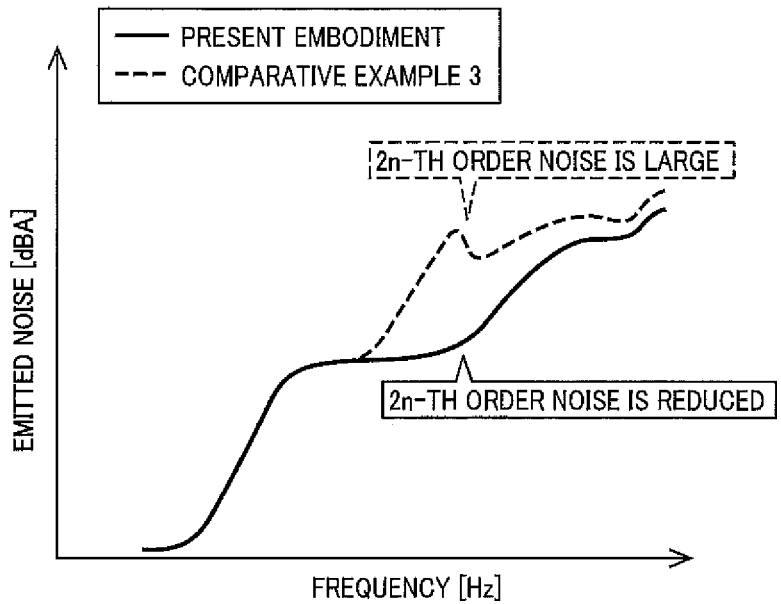
FIG. 7 is a view for comparing 2n-th order noise in the fastening structure in the embodiment of the invention, with that in a comparative example.
Figure 8:
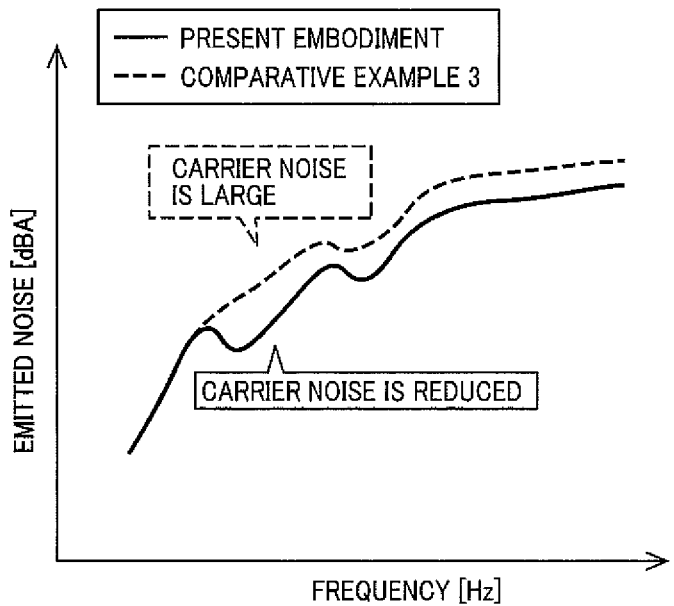
FIG. 8 is a view for comparing carrier noise in the fastening structure in the embodiment of the invention, with that in the comparative example.

Each of FIGS. 6-8 is a view for comparing noise emitted from the motor case 22 in the fastening structure in the present embodiment, with that in a comparative example or examples. FIG. 6 is a view for comparing the 6n-th order noise, FIG. 7 is a view for comparing the 2n-th order noise, and FIG. 8 is a view for comparing the carrier noise.

In FIG. 6, a broken line indicates the emitted noise in comparative example 1 in which the fastening structure is constructed such that a stator core (like the stator core 16c1 shown in FIG. 5) is fastened, in a cantilever manner, directly to a low rigidity portion of a motor case (like the motor case 22) through stator fastening bolts (like the stator fastening bolts 36). Further, a two-dot chain line indicates the emitted noise in comparative example 2 in which the fastening structure is constructed such that a stator core (like the stator core 16c1 shown in FIG. 5) is fastened, in a cantilever manner, indirectly to a low rigidity portion of a motor case (like the motor case 22) through stator fastening portions of a plate-shaped intermediate member which has a low rigidity and which does not include a protrusion. A narrow solid line a indicates a target value of the emitted noise, i.e., an allowable upper limit value of the emitted noise, which is set by taking account of a fact that reduction of frequency of the stator vibration causes the vibration damping to be reduced in the vehicle 10 and vibration transmission sensitivity of the vehicle 10 to be unfavorably increased, and accordingly causes the vibration to be more easily transmitted through the vehicle 10. In the comparative example 1, the 6-th order noise is generally increased due to increase of a transmission path of the stator vibration to the motor case 22. In the comparative example 2, the transmission of the stator vibration is reduced owing to the intermediate member that is provided between the stator core and the motor case. However, in the comparative example 2, the rigidity of the stator fastening portions of the intermediate member in the circumferential direction is reduced, whereby the stator vibration itself acting in the circumferential direction is increased and the resonance frequency range is shifted to a lower frequency range. Thus, in the comparative example 2, although the peak value of the 6-th order noise is made lower than in the comparative example 1, the 6-th order noise as a whole is not improved. On the other hand, in the present embodiment indicated by a thick solid line, the rigidity of the stator fastening portions 24b2 in the circumferential direction is held high so that the stator vibration itself acting in the circumferential direction is not increased and the resonance frequency range is not shifted to a lower frequency range. Further, in the present embodiment, the 6-th order noise is made lower than in the comparative example 1, owing to the arrangement in which the stator 16c is fastened to the portion of the motor case 22, which is located on the side of the engine block 14a having a high rigidity. Therefore, in the present embodiment, the 6-th order noise is improved. The same description is also applied to the 12n-th order noise. That is, the 12n-th order noise as well as the 6-th order noise is improved in the present embodiment.

In FIGS. 7 and 8, a broken line indicates the emitted noise in comparative example 3 in which the fastening structure is constructed such that a stator core (like the stator core 16c1 shown in FIG. 5) is fastened, in a cantilever manner, indirectly to a high rigidity portion of a motor case (like the motor case 22) which is located on a side of the engine block 14a, through stator fastening portions of a plate-shaped intermediate member which does not has a protrusion. In the comparative example 3, the rigidity of the stator fastening portions of the intermediate member in the radial direction is not reduced, so that the transmission of the stator vibration acting in the radial direction, to the motor case 22 is not damped. Thus, in the comparative example 3, the 2n-th order noise in a high frequency range and the carrier noise are not improved. On the other hand, in the present embodiment indicated by a thick solid line, the rigidity of the stator fastening portions 24b2 in the radial direction is reduced whereby the 2n-th order noise and carrier noise are improved. It is noted that, in the comparative example 3, since the stator is fastened to the high rigidity portion of the motor case that is located on the side of the engine block 14a, the 6n-th order noise and 12n-th order noise are improved.

As described above, in the present embodiment, the stator 16c of the rotating machine 16 is fastened in a cantilever manner to the case cover 24 through the plurality of stator fastening portions 24b2 of the annular-shaped protrusion 24b of the annular-shaped protrusion 24b of the case cover 24, so that the rigidity of the stator fastening portions 24b2 in the circumferential direction is maintained while the rigidity of the stator fastening portions 24b2 in the radial direction of the rotating machine 16 is reduced. Since the rigidity of the stator fastening portions 24b2 in the circumferential direction is maintained, it is possible to prevent increase of the stator vibration acting in the circumferential direction and relating to the 6n-th order noise and 12n-th order noise and to prevent the resonance frequency range from being shifted to a lower frequency range in which the vibration transmission sensitivity of the vehicle 10 is unfavorably increased. Further, since the rigidity of the stator fastening portions 24b2 in the radial direction of the rotating machine 16 is reduced, it is possible to damp the stator vibration acting in the radial direction and relating to the 2n-th order noise and carrier noise and accordingly to reduce transmission of the stator vibration in the radial direction to the motor case 22. Moreover, since the case cover 24 is fastened to the high rigidity of the motor case 22, namely, to the engine-side end portion 22b that is located on the side of the engine-side end portion 22b, it is possible to reduce transmission of the stator vibration in the circumferential direction to the motor case 22. Thus, it is possible to reduce all of the plurality of kinds of motor noises caused by the stator vibration.

In the present embodiment, the radial thickness of the annular-shaped protrusion 24b is larger in the stator fastening portions 24b2 than in the cylindrical tubular portion 24b1, namely, the radial thickness of the annular-shaped protrusion 24b is smaller in the cylindrical tubular portion 24b1 than in the stator fastening portions 24b2, so that the rigidity of the stator fastening portions 24b2 in the radial direction is more reduced. Thus, the transmission of the stator vibration acting in the radial direction and relating to the 2n-th order noise and carrier noise can be more effectively damped.

In the present embodiment, the given number of stator fastening portions 24b2 is equal to or twice as large as the given number N of pair or pairs of N and S poles constituted by the permanent magnets 16d of the rotor 16b, and the given number of stator fastening portions 24b2 are arranged at the constant interval in the circumferential direction. Thus, it is possible to reduce the stator vibration acting in the radial direction which is caused by stator resonance vibration in a low frequency range, e.g., in the neighborhood of 500 Hz, and which relates to the 2n-th order noise.

In the present embodiment, the stator 16c, which is disposed outside the rotor 16b in the radial direction, includes the plurality of radially protruding portions 16c1p having the respective radially protruding portions 16c1p that receive the respective stator fastening bolts 36 through which the stator 16c is fastened to the stator fastening portions 24b2. Thus, the stator 16c is appropriately fastened, in a cantilever manner, to the case cover 24.

In the present embodiment, it is possible to reduce all of the plurality of kinds of motor noises, without undesirably increasing the cost, weight, size and loss While the preferred embodiment of this invention has been described in detail by reference to the drawings, it is to be understood that the invention may be otherwise embodied.

For example, in the above-described embodiment, the case cover 24 is fastened to a portion of the motor case 22 which is located on the side of the engine block 14a. However, for example, where the motor case 22 is fastened at its fastened portion to a high rigidity portion of a body of the vehicle 10 as a non-rotary member, the case cover 24 may be fastened to the fastened portion of the motor case 22. That is, the case cover 24 may be fastened to any high rigidity portion of the motor case 22, which has a relatively high rigidity. Therefore, the present invention is applicable also to a vehicle driving apparatus that does not include an engine. In other words, the present invention is applicable to any vehicle drive apparatus, which includes: a rotating machine including a rotor and a stator; and a motor case storing therein the rotating machine and fastened to a non-rotary member.

Further, in the above-described embodiment, the intermediate member is constituted by the case cover 24 that is provided between the stator 16c and the motor case 22, namely, between the rotating machine 16 and the motor case 22. However, the intermediate member does not constituted necessarily by a case cover, but may be another member which is fastened to the motor case 22 and to which the stator 16c is fastened.

Further, in the above-described embodiment, the radial thickness of the annular-shaped protrusion 24b is larger in the stator fastening portions 24b2 than in the cylindrical tubular portion 24b1, namely, the radial thickness of the annular-shaped protrusion 24b is smaller in the cylindrical tubular portion 24b1 than in the stator fastening portions 24b2. However, the radial thickness of the annular-shaped protrusion 24b may be substantially the same in the cylindrical tubular portion 24b1 as in the stator fastening portions 24b2. In this modified arrangement, too, the rigidity of the stator fastening portions 24b2 in the radial direction is reduced owing to the annular shape of the protrusion 24b, so that the 2n-th order noise and the carrier noise can be reduced. Further, in the above-described embodiment, the stator fastening portions 24b2 protrude from the surface 24a3 in the direction of the axis Cm by the same distance as the cylindrical tubular portion 24b1, as shown in FIG. 4. However, the stator fastening portions 24b2 may protrude by a lager distance than the cylindrical tubular portion 24b1.

Further, in the above-described embodiment, the number of the stator fastening portions 24b2 is equal to or twice as large as the number n of the pair or pairs of N and S poles constituted by the permanent magnets 16d of the rotor 16b, so that the stator vibration acting in the radial direction and relating to the 2n-th order noise is reduced whereby the 2n-th order noise is reduced. However, in the above-described embodiment, the rigidity of the stator fastening portions 24b2 in the radial direction is reduced owing to the annular shape of the protrusion 24b so that the transmission of the stator vibration in the radial direction to the motor case 22 is damped whereby the 2n-th order noise is reduced. Therefore, the number of the stator fastening portions 24b2 does not necessarily have to be equal to or twice as large as the number n of the pair or pairs of N and S poles.

It is to be understood that the embodiment described above is given for illustrative purpose only, and that the present invention may be embodied with various modifications and improvements which may occur to those skilled in the art.

NOMENCLATURE OF ELEMENTS

12: vehicle driving apparatus
14a: engine block (non-rotary member)
16: rotating machine
16b: rotor
16c: stator
16c1i: bolt receiving holes (holes through which bolts pass)
16c1p: radially protruding portions
16d: permanent magnets
22: motor case
22b: engine-side end portion (portion having relatively high rigidity)
22c: flange portion (portion fastened to engine block)
24: case cover (intermediate member)
24a: main body
24a3: surface
24b: protrusion
24b1: cylindrical tubular portion (portion other than stator fastening portions)
24b2: stator fastening portions
36: stator fastening bolts (bolts used to fasten stator)
Cm: axis

What is claimed is:

1. A vehicle driving apparatus comprising:
a rotating machine including a rotor and a stator;
a motor case storing therein said rotating machine and fastened to an engine block; and
an intermediate member including (i) a main body having a flat plate shape and (ii) a protrusion which protrudes in a direction of an axis of said rotating machine from a surface of said main body on a side of said rotating machine and which has an annular shape surrounding said axis,
wherein said protrusion of said intermediate member includes a plurality of stator fastening portions through which said stator of said rotating machine is fastened to said intermediate member,
wherein said intermediate member is fastened to a high rigidity portion of said motor case that has a higher rigidity than a remaining portion of said motor case,
wherein said motor case has an opening in an end thereof on a side of said engine block,
wherein said intermediate member is a case cover that covers at least an entire peripheral area of said opening of said motor case, and
wherein said high rigidity portion of said motor case is closer than the remaining portion of said motor case to said engine block.

2. The vehicle driving apparatus according to claim 1,
wherein said motor case is fastened at a fastened portion thereof to said engine block, and
wherein said high rigidity portion of said motor case is closer than the remaining portion of said motor case to said fastened portion of said motor case.

3. The vehicle driving apparatus according to claim 1,
wherein said protrusion, which has the annular shape, has a radial thickness measured in a radial direction of said rotating machine, and
wherein said radial thickness of said protrusion is larger in said stator fastening portions than in a remaining portion of said protrusion.

4. The vehicle driving apparatus according to claim 1,
wherein said rotor of said rotating machine includes permanent magnets that constitute a given number of pair or pairs of N and S poles,
wherein said plurality of stator fastening portions of said protrusion consist of a given number of stator fastening portions such that the given number of stator fastening portions is equal to or twice as large as the given number of pair or pairs of N and S poles constituted by said permanent magnets of said rotor, and
wherein said given number of stator fastening portions are arranged at a constant interval.

5. The vehicle driving apparatus according to claim 1,
wherein said stator is disposed outside said rotor in a radial direction of said rotating machine,
wherein said stator includes a plurality of radially protruding portions which are arranged around said axis and which protrude outwardly in said radial direction, and
wherein said plurality of radially protruding portions have respective holes that receive respective bolts though which said stator is fastened to said stator fastening portions.

6. The vehicle driving apparatus according to claim 1,
wherein said stator is supported in a cantilever manner at one of opposite end portions thereof that are opposite to each other in the direction of said axis, by said protrusion of said intermediate member.

* * * * *